United States Patent
Shah et al.

(10) Patent No.: US 11,356,306 B2
(45) Date of Patent: Jun. 7, 2022

(54) TECHNOLOGIES FOR COOPERATIVE LINK EQUALIZATION WITHOUT DISRUPTION TO LINK TRAFFIC

(71) Applicant: Intel Corporation, Santa Clara, CA (US)

(72) Inventors: Nishantkumar Shah, Portland, OR (US); Kevan A. Lillie, Chandler, AZ (US); Adee Ofir Ran, Maayan Baruch (IL); Itamar Levin, Holon (IL); Kent Lusted, Aloha, OR (US)

(73) Assignee: Intel Corporation, Santa Clara, CA (US)

( * ) Notice: Subject to any disclaimer, the term of this patent is extended or adjusted under 35 U.S.C. 154(b) by 875 days.

(21) Appl. No.: 15/941,071

(22) Filed: Mar. 30, 2018

(65) Prior Publication Data
US 2019/0044763 A1 Feb. 7, 2019

(51) Int. Cl.
*H04L 12/28* (2006.01)
*H04L 25/03* (2006.01)
*H04L 69/324* (2022.01)
*H04L 43/04* (2022.01)
*H04L 43/08* (2022.01)
*H04L 43/16* (2022.01)

(52) U.S. Cl.
CPC ........ *H04L 25/03885* (2013.01); *H04L 43/04* (2013.01); *H04L 43/08* (2013.01); *H04L 69/324* (2013.01); *H04L 43/16* (2013.01); *H04L 2025/03535* (2013.01); *H04L 2025/03777* (2013.01)

(58) Field of Classification Search
CPC ........................................................ H04L 43/04
USPC ............................................................ 370/252
See application file for complete search history.

(56) References Cited

U.S. PATENT DOCUMENTS

| | | | |
|---|---|---|---|
| 2003/0175947 A1* | 9/2003 | Liu ..................... | B01L 3/50273 435/288.5 |
| 2017/0019247 A1 | 1/2017 | Iyer et al. | |
| 2017/0149659 A1 | 5/2017 | K et al. | |
| 2017/0317858 A1 | 11/2017 | Henry et al. | |
| 2017/0366475 A1 | 12/2017 | Raza et al. | |
| 2018/0034769 A1 | 2/2018 | Modi et al. | |

OTHER PUBLICATIONS

International search report for PCT application No. PCT/US2019/019962, dated Jun. 5, 2019 (3 pages).
Written opinion for PCT application No. PCT/US2019/019962, dated Jun. 5, 2019 (5 pages).

* cited by examiner

*Primary Examiner* — Dang T Ton
(74) *Attorney, Agent, or Firm* — Compass IP Law, PC

(57) ABSTRACT

Technologies for cooperative link equalization include a network device with a network interface controller (NIC). The NIC is to monitor variation in a property of a link channel that connects the network device with a target network device. The NIC detects, based on the channel variation, an event that triggers a condition to change an equalization setting of the link channel. In response to the detection, the NIC communicates, via an in-band equalization control channel, changes to the equalization setting of the link channel to the target network device.

15 Claims, 8 Drawing Sheets

TECHNOLOGIES FOR COOPERATIVE LINK EQUALIZATION WITHOUT DISRUPTION TO LINK TRAFFIC

BACKGROUND

Network devices, such as wireless base stations may be subject to variation in insertion loss, which refers to the loss of signal power resulting from inserting a network device in a transmission line or optical fiber. For instance, low-cost materials used in manufacturing a network device may have relatively low resistance to temperature fluctuations and consequently result in insertion loss. Subsequently, because of the variation, a signal-to-noise ratio (SNR) between wireless base stations may decrease, which in turn can lead to relatively poor link performance and high bit error rates.

Generally, network devices may improve SNR by adjusting link equalization settings. For example, a given network device may undergo link training with another network device. During link training, the communication link between the network devices is broken and reconnected to allow equalization settings to be retrained. However, this approach may disrupt ongoing network traffic. For instance, in some cases, some physical layer specifications might require that a communication link be brought down completely to retrain the link.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
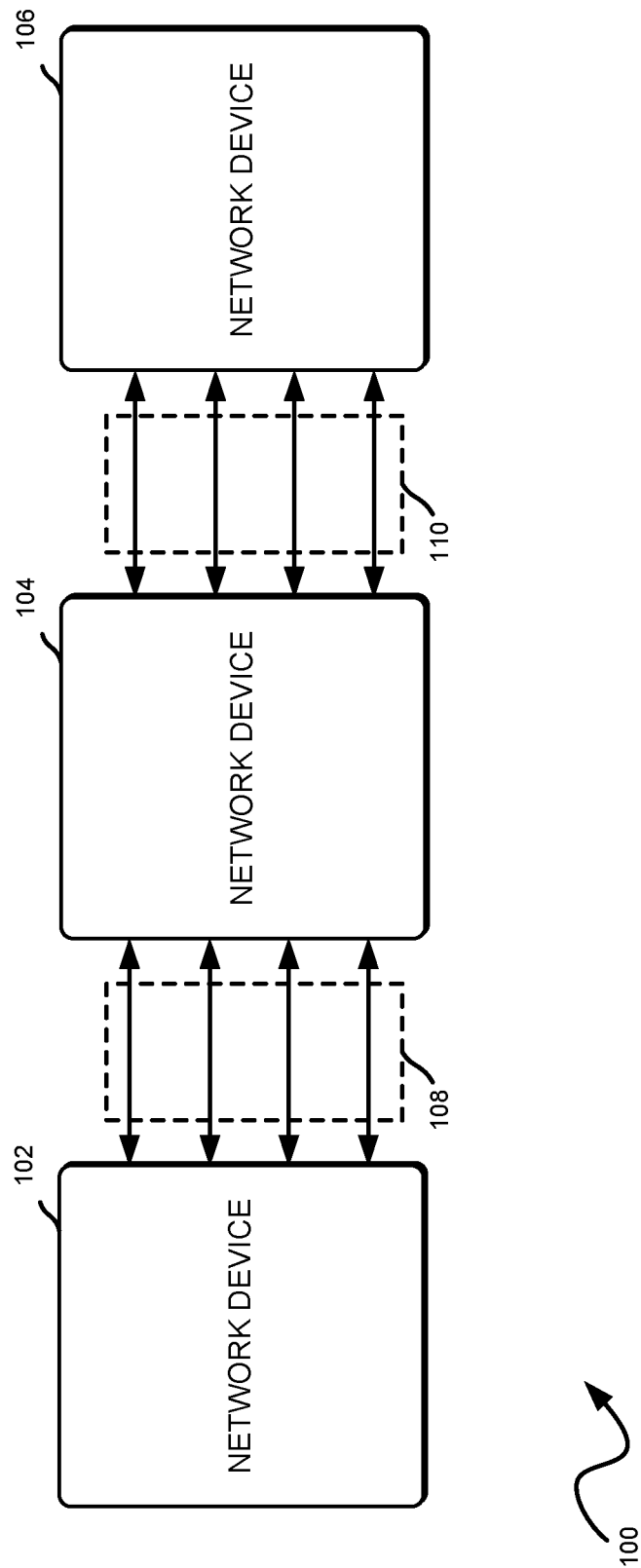
FIG. 1 is a simplified block diagram of at least one embodiment of a computing environment to establish an in-band equalization control channel between a given network device and another network device.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, a computing environment 100 in which multiple network devices 102 are communicatively coupled with one another over one or more communication links. In some embodiments, the computing environment 100 is representative of an Ethernet subsystem of network devices 102, 104, and 106 communicating over communication lanes 108 and 110. Each of the network devices 102, 104, and 106 may be connected to one another using a variety of interconnects and at varying speeds. As will be further described herein, a network device (e.g., the network device 102) may adjust link equalization settings with another network device (e.g., the network device 104) via an in-band communication channel. More particularly, embodiments herein disclose an equalization control channel allowing in-band communication (e.g., through the communication lanes 108, 110 rather than through a separate network) between network devices to adjust equalization settings (e.g., using a request/response messaging format) without causing disruption to network traffic flows.

Each network device (e.g., network device 102) may include Ethernet port logic that includes a physical medium dependent (PMD) sublayer/physical medium attachment (PMA) sublayer, a forward error correction (FEC) sublayer, a physical coding sublayer (PCS) module, and a reconciliation sublayer/media access control sublayer (MAC) module. Additionally, in some embodiments, one or more of the illustrative components may be incorporated in, or otherwise form a portion of, another component. For example, part or all of the PMD/PMA and/or the FEC may be incorporated in the PCS. The MAC is configured to transmit Ethernet frame data to the PCS to be encoded and transmitted, and to receive data from the PCS to produce Ethernet frame data. The MAC communicates with the PCS via a media-independent interface. For example, the MAC may communicate via a 40-gigabit media-independent interface (XLGMII), a 100-gigabit media-independent interface (CGMII), or any appropriate interface. The MAC may perform Ethernet frame detection and validation, packet reception and transmission, cyclic redundancy check (CRC) validation, CRC computation, and other media access control sublayer operations. In addition, as further described, the MAC may encode equalization control channel request/response messages that include parameters (e.g., coefficient numbers) associated with a communication lane to update.

The PCS is configured to encode Ethernet frame data received from the MAC into encoded data blocks that may be transmitted by the PMD/PMA, and to decode data received from the PMD/PMA into decoded Ethernet frame data that may be processed by the MAC. The PCS may encode and distribute the data blocks over one or more logical PCS lanes (PCSLs). Each PCS lane may operate at 5 Gb/s or at 10 Gb/s, similar to the PCS as specified by clause 82 of the IEEE 802.3 standard. The PCS may encode data for transmission over the communication lanes for example, to improve communication efficiency. For example, encoding the data may add timing or synchronization symbols, align the data, add state transitions to the encoded data to improve clock recovery, adjust the DC balance of the data signal, or otherwise prepare the encoded data for serial transmission. The PCS may be capable of encoding or decoding the data using a 64 b/66 b line code in which 64-bit blocks of data are encoded into 66-bit blocks of encoded data, and vice versa.

Further still, the communication lanes 108 and 110 may be embodied as any one or more computer communication links. For example, each communication lane 108 may be embodied as a twisted pair conductor or an electrical backplane connection. In some embodiments, each communication lane 108 may be capable of full-duplex operation. For example, each communication lane 108 may include two pairs of electrical conductors, one pair for transmitting data and the other pair for receiving data. Illustratively, the communication lanes 108 may include four communication lanes 108 operating at 10 Gb/s each, four communication lanes 102 operating at 25 Gb/s each, or ten communication lanes 108 operating at 10 Gb/s each (for 40 Gb/s, 100 Gb/s, and 100 Gb/s total bandwidth, respectively). Although described as operating at a data rate such as 10 Gb/s, it should be understood that in some embodiments the communications lanes 108 may operate at a slightly higher signaling rate such as 10.3125 Gb/s, to allow for additional data for line encoding, error correction, and other additional data.

Note, although the above references an Ethernet subsystem as an example communication interface for creating an equalization control channel to adjust equalization settings in-band with a link partner, one of skill in the art will recognize that embodiments presented herein may be adapted with a variety of communication interfaces, such as high-speed serial interfaces. For instance, the request/response message structure for the equalization channel may be carried out in interfaces including, without limitation, the PCI Express (PCIe), Universal Serial Bus (USB), Fibre Channel (FC), Serial ATA (SATA), Serial Attached SCSI (SAS), Omni-Path Architecture (OPA), Infiniband, and RapidIO interfaces.

Figure 2:
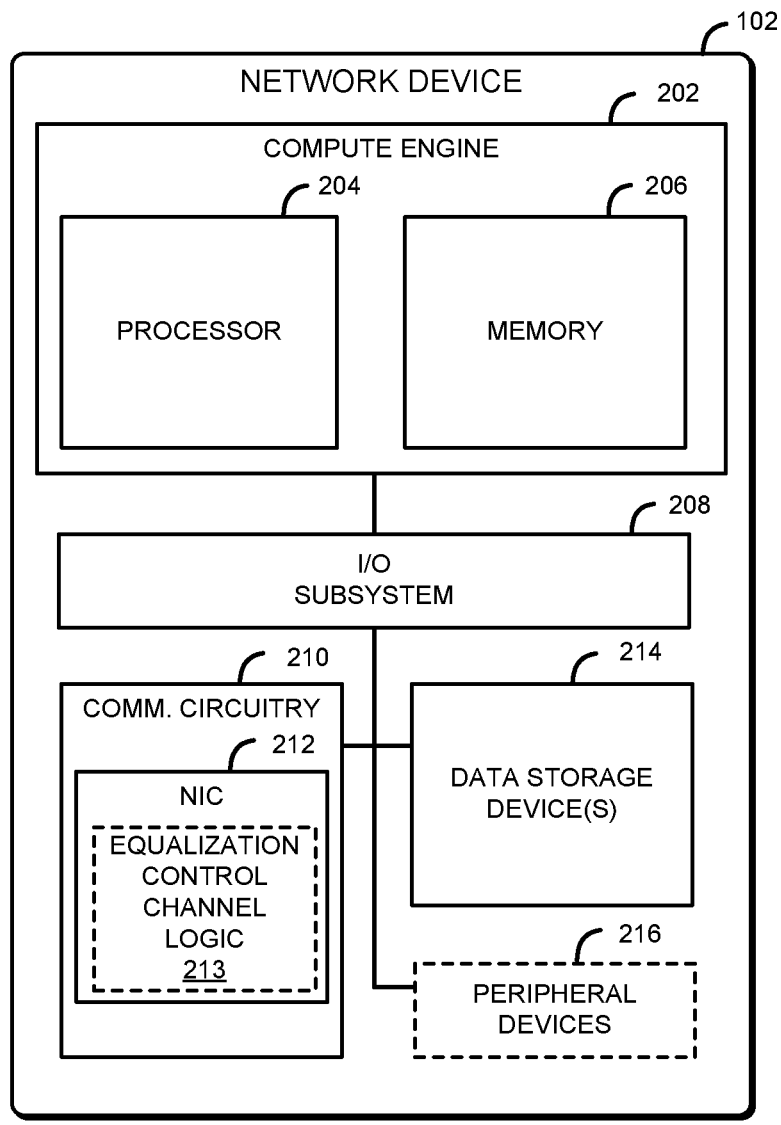
FIG. 2 is a simplified block diagram of at least one embodiment of a network device of the computing environment of FIG. 1.

Referring now to FIG. 2, a network device 102 may be embodied as any type of device capable of performing the functions described herein, including monitoring variation in properties of a link channel connecting the network device 102 with another network device 102, detecting an event that triggers one or more conditions to change one or more of the properties of the link channel, and communicating changes to the one or more of the properties of the link channel to the other network device 102 via an in-band equalization control channel.

As shown, the illustrative network device 102 includes a compute engine 202, an input/output (I/O) subsystem 208, communication circuitry 210, and one or more data storage devices 214. Of course, in other embodiments, the network device 102 may include other or additional components, such as those commonly found in a computer (e.g., display, peripheral devices, etc.), such as peripheral devices 216. Additionally, in some embodiments, one or more of the illustrative components may be incorporated in, or otherwise form a portion of, another component.

The compute engine 202 may be embodied as any type of device or collection of devices capable of performing various compute functions described below. In some embodiments, the compute engine 202 may be embodied as a single device such as an integrated circuit, an embedded system, a field programmable gate array (FPGA), a system-on-a-chip (SOC), or other integrated system or device. Additionally, in some embodiments, the compute engine 202 includes or is embodied as a processor 204 and a memory 204. The processor 204 may be embodied as one or more processors, each processor being a type capable of performing the functions described herein. For example, the processor 204 may be embodied as a single or multi-core processor(s), a microcontroller, or other processor or processing/controlling circuit. In some embodiments, the processor 204 may be embodied as, include, or be coupled to an FPGA, an ASIC, reconfigurable hardware or hardware circuitry, or other specialized hardware to facilitate performance of the functions described herein.

The memory 206 may be embodied as any type of volatile (e.g., dynamic random access memory, etc.) or non-volatile memory (e.g., byte addressable memory) or data storage capable of performing the functions described herein. Volatile memory may be a storage medium that requires power to maintain the state of data stored by the medium. Non-limiting examples of volatile memory may include various types of random access memory (RAM), such as DRAM or static random access memory (SRAM). One particular type of DRAM that may be used in a memory module is synchronous dynamic random access memory (SDRAM). In particular embodiments, DRAM of a memory component may comply with a standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Such standards (and similar standards) may be referred to as DDR-based standards and communication interfaces of the storage devices that implement such standards may be referred to as DDR-based interfaces.

In one embodiment, the memory device is a block addressable memory device, such as those based on NAND or NOR technologies. A memory device may also include a three dimensional crosspoint memory device (e.g., Intel 3D XPoint™ memory), or other byte addressable write-in-place nonvolatile memory devices. In one embodiment, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory. The memory device may refer to the die itself and/or to a packaged memory product.

In some embodiments, 3D crosspoint memory (e.g., Intel 3D XPoint™ memory) may comprise a transistor-less stackable cross point architecture in which memory cells sit at the intersection of word lines and bit lines and are individually addressable and in which bit storage is based on a change in bulk resistance. In some embodiments, all or a portion of the memory 206 may be integrated into the processor 204.

The compute engine 202 is communicatively coupled with other components of the computing environment 100 via the I/O subsystem 208, which may be embodied as circuitry and/or components to facilitate input/output operations with the compute engine 202 (e.g., with the processor 204 and/or the memory 206) and other components of the network device 102. For example, the I/O subsystem 208 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some embodiments, the I/O subsystem 208 may form a portion of a system-on-a-chip (SoC) and be incorporated, along with one or more of the processor 204, the memory 206, and other components of the network device 102, into the compute engine 202.

The communication circuitry 210 may be embodied as any communication circuit, device, or collection thereof, capable of enabling communications over a network between the network device 102 and another network device 102. The communication circuitry 210 may be configured to use any one or more communication technology (e.g., wired or wireless communications) and associated protocols (e.g., Ethernet, Bluetooth®, Wi-Fi®, WiMAX, etc.) to effect such communication.

The illustrative communication circuitry 210 includes a network interface controller (NIC) 212, which may also be referred to as a host fabric interface (HFI). The NIC 212 may be embodied as one or more add-in-boards, daughtercards, controller chips, chipsets, or other devices that may be used by the computing device 200 for network communications with remote devices. For example, the NIC 212 may be embodied as an expansion card coupled to the I/O subsystem 208 over an expansion bus such as PCI Express. The NIC 212 includes an Ethernet port logic to connect to remote network devices. Of course, in other embodiments the network device 102 may include additional Ethernet port logics to support a different number of communication lanes. The NIC 212 also includes equalization control channel logic 213 which may be embodied as any device or circuitry (e.g., a co-processor, an ASIC, etc.) capable of establishing an in-band equalization control channel between the network device 102 and another network device.

The one or more illustrative data storage devices 214 may be embodied as any type of devices configured for short-term or long-term storage of data such as, for example, memory devices and circuits, memory cards, hard disk drives (HDDs), solid-state drives (SSDs), or other data storage devices. Each data storage device 214 may include a system partition that stores data and firmware code for the data storage device 214. Each data storage device 214 may also include an operating system partition that stores data files and executables for an operating system.

Additionally or alternatively, the network device 102 may include one or more peripheral devices 216. Such peripheral devices 216 may include any type of peripheral device commonly found in a compute device such as a display, speakers, a mouse, a keyboard, and/or other input/output devices, interface devices, and/or other peripheral devices.

Figure 3:
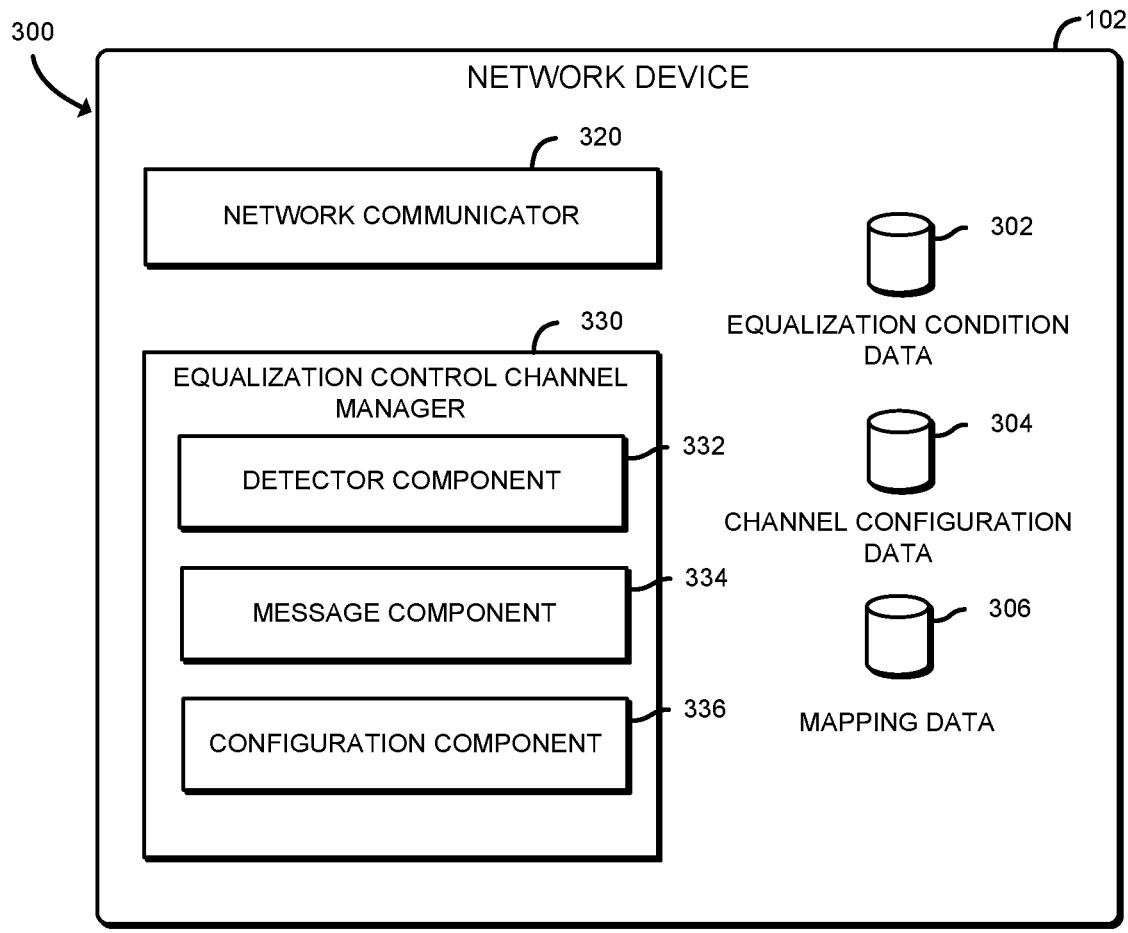
FIG. 3 is a simplified block diagram of at least one embodiment of an environment that may be established by the network device of FIG. 2.

Referring now to FIG. 3, the network device 102 may establish an environment 300 during operation. The illustrative environment 300 includes a network communicator 320 and an equalization control channel manager 330. Each of the components of the environment 300 may be embodied as hardware, firmware, software, or a combination thereof. As such, in some embodiments, one or more of the components of the environment 300 may be embodied as circuitry or a collection of electrical devices (e.g., network communicator circuitry 320, equalization control channel manager circuitry 330, etc.). It should be appreciated that, in such embodiments, one or more of the network communicator circuitry 320 or the equalization control channel manager circuitry 330 may form a portion of the NIC 212 (or other components of the network device 102). In the illustrative embodiment, the environment 300 includes equalization condition data 302, which may be embodied as any data indicative of conditions for adjusting equalization settings for a communication lane between the network device 102 and another network device (e.g., the network device 104). As such, in some embodiments, the equalization condition data 302 may include data indicative of whether a temperature of hardware components on the network device 102 exceeds a threshold temperature, whether the update of the communication channel with the other network device (e.g., the network device 104) exceeds a threshold period, and the like. The environment 300 also includes channel configuration data 304, which may be embodied as any data indicative of equalization settings for a given channel, such as coefficient numbers used per communication lane, and the like. The environment 300 also includes mapping data 306, which may be embodied as any data indicative of mappings of logical lane numbers (e.g., PCS lanes) to physical lanes as recognized by the network device 102.

In the illustrative environment 300, the network communicator 320 which may be embodied as hardware, firmware, software, virtualized hardware, emulated architecture, and/or a combination thereof as discussed above, is configured to facilitate inbound and outbound network communications (e.g., network traffic, network frames, network packets, network flows, etc.) to and from the network device 102, respectively. To do so, the network communicator 320 is configured to prepare and send network frames to another network device. Accordingly, in some embodiments, at least a portion of the functionality of the network communicator 320 may be performed by the communication circuitry 210, and, in the illustrative embodiment, by the NIC 212.

The equalization channel control manager 330, which may be embodied as hardware, firmware, software, virtualized hardware, emulated architecture, and/or a combination thereof, is configured to monitor variation in properties of a link channel that connects the network device 102 with another network device, detect an event that pursuant to the conditions set forth in the equalization condition data 302, should result in one or more changes to one or more of the properties of the link channel, and communicate those changes to the properties via the equalization control channel. To do so, the equalization control channel manager 330 includes a detector component 332, a message component 334, and a configuration component 336.

The detector component 332 is configured to monitor variation in the link channel between the network device 102 and another network device. More particularly, the detector component 332 is to monitor one or more properties that may influence variation in the link channel, such as insertion loss (loss of signal power resulting from insertion of the network device 102 to a communication link or optical fiber) or temperature of the on-die hardware components of the network device 102 (which, due to cost considerations during manufacture, may have relatively weak resistance to temperature fluctuations and thus reduce a signal-to-noise (SNR) ratio in the link channel). Other properties may include an age of the device 120 or an uptime of the link channel. Further, the detector component 332 is to evaluate the monitored properties relative to the equalization condition data 302 and determine whether one or more of the conditions in the equalization condition data 302 is triggered. For example, the equalization condition data 302 may specify various thresholds relating to the monitored properties, such as temperature thresholds, timing thresholds, convergence thresholds, and the like. If triggered, the detector component 332 may communicate the triggered conditions and related properties to the message component 334.

The message component 334 is to encode an equalization control request or response message to be sent over the equalization control channel to another network device (e.g., the network device 104). More particularly, the message component 334 may encapsulate the equalization control message in a network frame, such as a frame to be sent over the PHY layer. For example, the message component 334 may encode the equalization control message as part of a PHY encoding scheme or use a higher layer protocol such as the Link Layer Discovery Protocol (LLDP). Such techniques are further described herein. In some cases, the message component 334 may encode an equalization control request that indicates no changes to be made. Such a request message allows the network device 102 to determine whether a target network device receiving the message is compatible with the equalization control channel, as the target network device may send a response message in return.

The configuration component 336 is to receive equalization control request messages from another network device and process the request. In processing the request, the configuration component 336, in the illustrative embodiment determines one or more parameters of the network device 102 (e.g., settings of the PHY transmitter) and update the parameter(s) based on the evaluation. For example, a given request may specify a modification to a coefficient number associated with one of the communication lanes 108. In turn, the configuration component 336 modifies the coefficient number according to the specified request.

It should be appreciated that each of the detector component 332, message component 334, and configuration component 336 may be separately embodied as hardware, firmware, software, virtualized hardware, emulated architecture, and/or a combination thereof. For example, the detector component 332 and message component 334 may be embodied as hardware components, while the configuration component 336 is embodied as a virtualized hardware component or as some other combination of hardware, firmware, software, virtualized hardware, emulated architecture, and/or a combination thereof.

Figure 4:
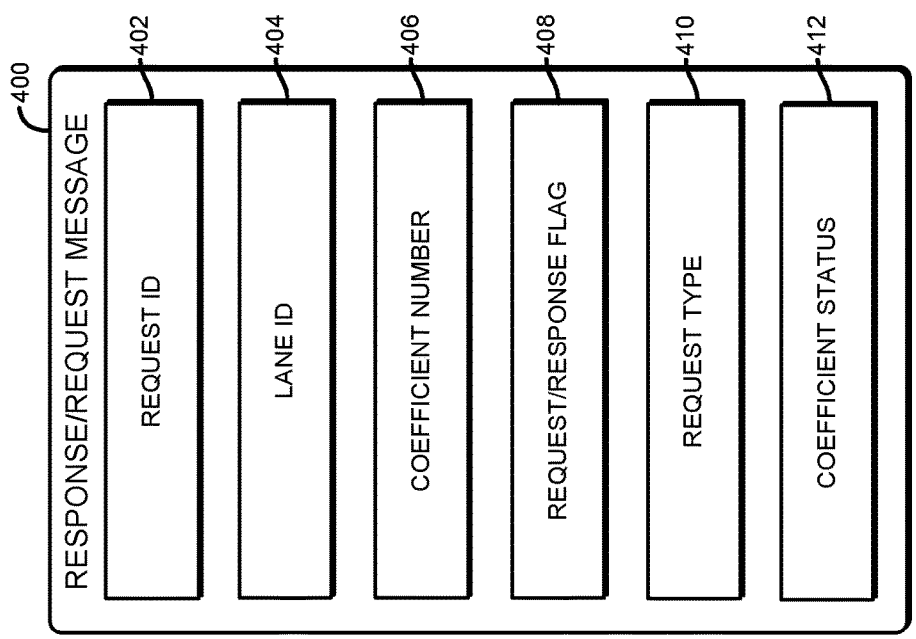
FIG. 4 is a simplified block diagram of at least one embodiment of an example request/response message that may be used to communicate between network devices via the in-band equalization control channel.

Referring now to FIG. 4, an example response/request message 400 is shown. Illustratively, the response/request message 400 includes a request identifier (ID) 402, a lane ID 404, a coefficient number 406, a request/response flag 408, a request type 410, and a coefficient status 412. Of course, the illustrative request/response message 400 depicts a non-exhaustive list of examples of information that can be provided with a request or a response message sent in-band over the equalization control channel. In practice, information actually provided with a request or a response message may vary based on the Physical Medium Dependent (PMD) PHY type.

The request ID 402 is indicative of an identifier that may be assigned to a given request and response message pair for a particular request. In some cases, such as in the event of a request timeout or other communication error, the network device 102 may resend a request message with the same request ID 402. Similarly, the network device 102 may also resend a response message with the same request ID 402.

The lane ID 404 is indicative of an identifier assigned to a given physical lane number (e.g., to be used in multi-lane PMD implementations). Identifying the lane ID 404 allows the network devices to control equalization per physical lane. In some cases, the lane ID 404 may correspond to a logical lane number used between the network device 102 and another network device. For example, the lane ID 404 may correspond to a Physical Coding Sublayer (PCS) lane number used between the devices. The network device 102 may correlate the PCS lane number to an actual physical lane by using mapping data 306. The coefficient number 406 is indicative of a coefficient number associated with a given request to be updated (e.g., incremented or decremented). In particular, the network device 102 may perform feed-forward equalization using the coefficient.

The request/response flag 408 is indicative of whether the message 400 corresponds to either a request or a response message. The request type 410 is included with a message 400 that corresponds to a request. The request type 410 is an indication of how to update the specified coefficient number 406, e.g., whether to increment or decrement the coefficient number 406. The increment or decrement may be set according to a predefined step size that is specified for a given PMD. The coefficient status 412 is included with a message 400 that corresponds to a response. The coefficient status 412 is indicative of an acknowledgment of whether the network device receiving the request was successful in updating the coefficient number 406. In the event that the update was unsuccessful, the coefficient status 412 may provide an error, e.g., in the form of an error code. Error codes may be defined separately for a given PMD.

Figure 5:
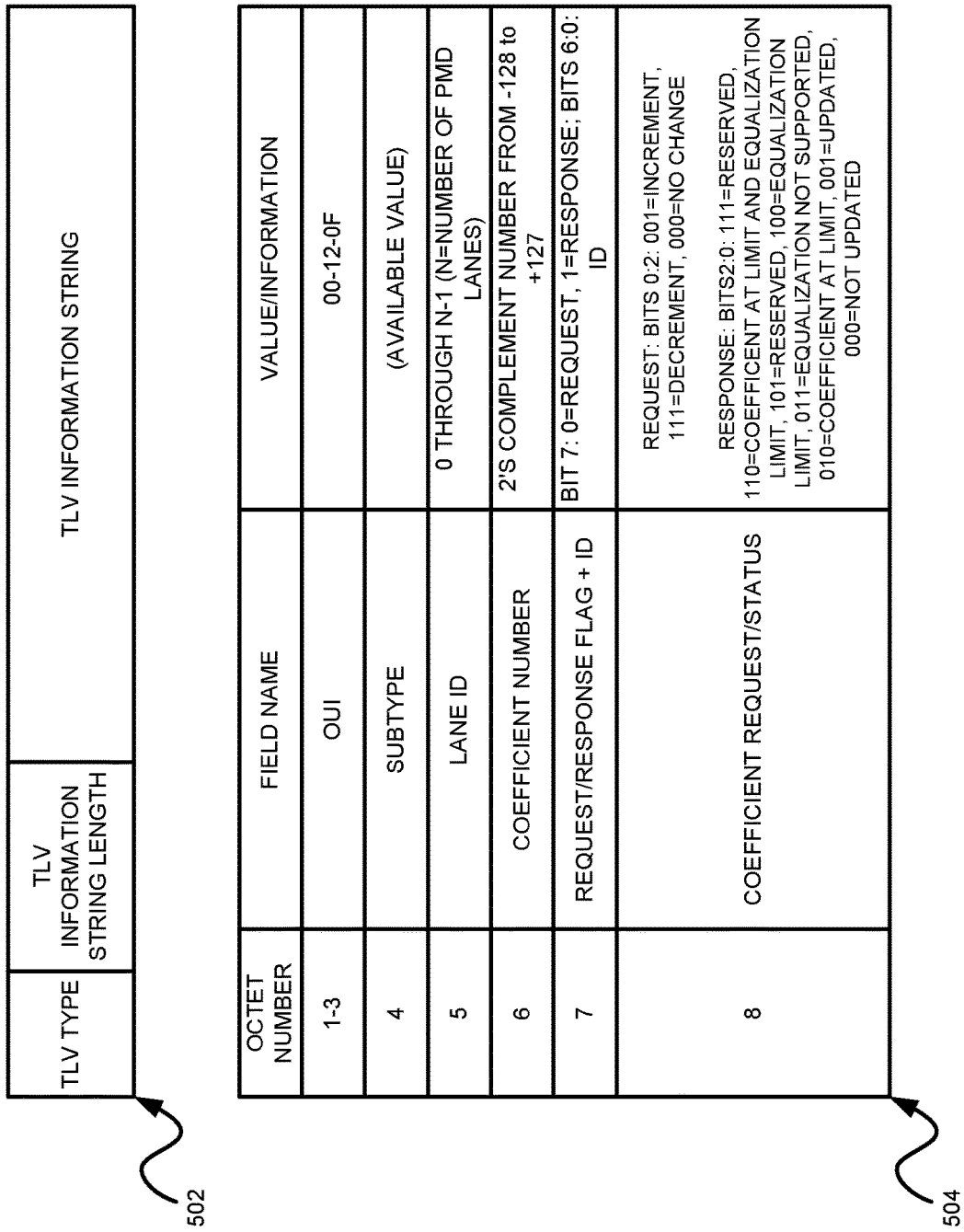
FIG. 5 is a simplified block diagram of at least one embodiment of a message format that may be used in establishing an in-band equalization control channel with the Link Layer Discovery Protocol (LLDP)

As stated, the equalization control channel and request/response messaging may be implemented via various in-band techniques. Referring now to FIG. 5, a simplified block diagram of an example implementation under the Link Layer Discovery Protocol (LLDP) is shown. Link Layer Discovery Protocol (LLDP) uses physical layer frames (e.g., Ethernet frames) that may be transmitted point-to-point to another network device from the network device 102. An LLDP subtype may be assigned to request/response messages sent as part of the equalization control channel. In such an approach, a network device 102 may format an LLDP frame as an equalization control channel-type request by specifying the subtype in the LLDP frame header.

Illustratively, frame 502 is representative of an example LLDP frame. The frame 502 includes a header that specifies a Type-Length-Value (TLV)-type and a TLV information string length. The frame 502 also includes a TLV information string. In some embodiments, the header includes information classifying the frame 502 to be indicative of an equalization control channel request/response message.

In an example embodiment, the TLV string length is eight octets. Illustratively, table 504 depicts information encoded in each octet. As shown, octets 1-3 in the frame 502 specify an organizationally unique identifier (OUI). Octet 4 is used for a subtype field. An available value may be specified for the subtype field. Octets 5-8 are used to encode the request/response message. For example, octet 5 is used to encode the lane ID, which can be a value from 0 through N−1, where N is equal to the number of PMD lanes. Octet 6 is used to encode the coefficient number to be updated in the PMD lane. Octet 7 is used to encode whether the message corresponds to a request or a response and also to encode the request ID. Octet 8 is used to encode whether to increment or decrement the coefficient (for request messages) or to a coefficient status (for response messages).

An LLDP frame may be handled by the MAC. Various methods may be used to implement how the PHY requests the MAC to create an outgoing LLDP containing a TLV subtype for the equalization channel. For instance, the Converged PHY Interface (CPI) may be used. Further, as stated, the network device 102 may encode a value in a request indicating that the coefficient number is not to be changed. Doing so allows the network device 102 to send an LLDP frame that indicates no change to check for support in a target network device, by determining whether the target network device sends a response. A lack of response may indicate that equalization requests are not supported by the target network device.

Note, the above uses LLDP as an example of an approach for establishing a control channel for tuning link equalization settings between interconnected network devices. However, one of skill in the art will recognize that other approaches are also applicable. For example, firmware in the network device 102 may be used in cases where firmware supports packet generation and inspection.

As another example, the network device 102 may encode an equalization control request/response message to periodic PCS alignment markers as part of the PHY encoding technique, which are mapped into blocks inserted into Reed Solomon Forward Error Correction (RS-FEC) codewords. The mapping process includes one or more pad bits that do not carry any information. For instance, the RS-FEC for 50 Gb/s Ethernet includes a single pad bit in each block of alignment markers sent once every 8,1920 PCS blocks (approximately once per one millisecond), which alternates between 0 and 1. The pad bits may instead form the equalization control channel by serializing a message (such as the TLV structure of frame 502) and sending one bit at a time.

As yet another example, the network device 102 may replace groups of idle characters that appear between physical frames (e.g., Ethernet frames) with an equalization control request or response. Network devices communicating over the equalization control channel under this approach may stream portions of request/response messages to one another using one or more characters at a time. Under the PHY encoding approaches described herein (e.g., using periodic PCS alignment markers and idle character replacement), encoding and decoding messages is internal to the PHY and does not require any higher level protocols.

Figure 6:
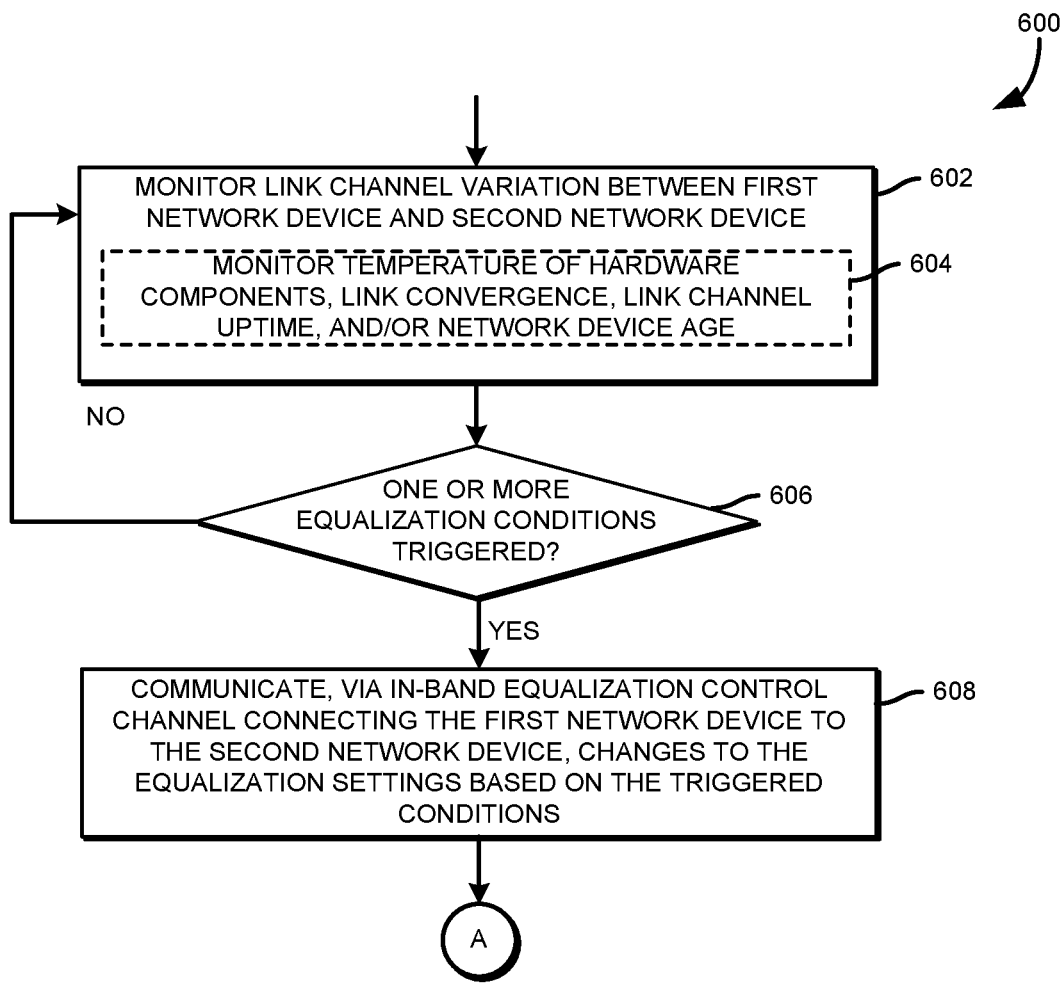
FIG. 6 is a simplified flow diagram of a method for determining instances under which to establish communications with another network device to adjust link equalization settings.

Referring now to FIG. 6, the network device 102, in operation, may perform a method 600 for determining instances under which to establish the equalization control channel with another network device to adjust link equalization settings. As shown, method 600 begins in block 602, where the network device 102 monitors link channel variation between the network device 102 and another network device. In particular, the network device 102 monitors several properties associated with the link channel and the network device 102. For example, in block 604, the network device 102 monitors a temperature of the hardware components of the device (e.g., using a temperature sensor located therein), an age of the connection, equalization convergence in the receiver, age of the network device 102, and so on. The network device 102 may monitor the link channel on a per-lane basis (e.g., in multi-lane PMD implementations).

In block 606, the network device 102 determines whether one or more conditions for equalizing the link channel connection is triggered. The network device 102 may identify, based on the monitored link channel variation, an event that triggers such conditions. For example, the network device 102 may determine that the temperature of the device exceeds a given threshold (or falls below another threshold). As another example, the network device 102 may determine that an uptime for the connection exceeds a threshold. If no conditions are triggered, the method 600 returns to block 602, where the network device 102 continues to monitor variation of the link channel.

Otherwise, in block 608, the network device 102 communicates, via the in-band equalization control channel between the network device 102 and the other network device, changes to the link equalization settings based on the triggered conditions. For instance, the network device 102 may send a request over the equalization control channel to adjust a coefficient number for the lane associated with the properties triggering the conditions.

Figure 7:
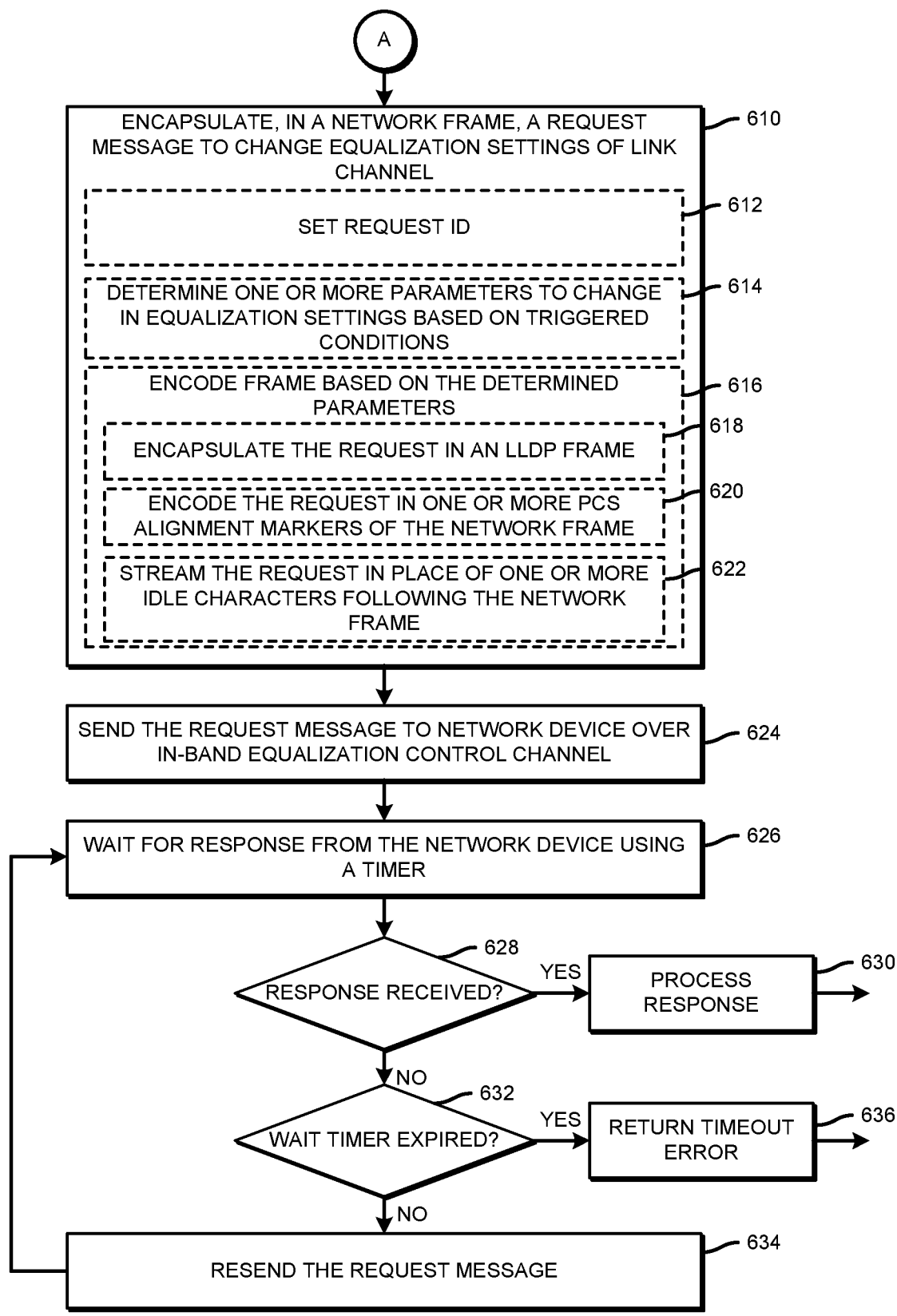
FIG. 7 is a simplified flow diagram of at least one embodiment of a method for sending a request to adjust link equalization settings over an in-band equalization control channel that may be performed by a network device of FIG. 1.

Referring now to FIG. 7, the network device 102, in operation may create a request message to send in-band over an equalization control channel between the network device 102 and another network device. In block 610, the network device 102 encapsulates, in a network frame, a request message to change equalization settings of a link channel. In particular, in block 612, the network device 102 sets a request ID to associate with the given request. Further, in block 614, the network device 102 determines one or more parameters to change in the equalization settings based on the triggered conditions. For example, given the monitored link variation and triggering event, the network device 102 may determine to adjust a given coefficient number associated with a particular lane in the link channel.

In block 616, the network device 102 encodes the frame based on the determined parameters. For example, in block 618, the network device 102 may create an LLDP frame with a header specifying that the frame is an equalization control channel message. The network device 102 may then encode other fields associated with an equalization control request message, such as lane ID of the associated lane with equalization settings to be adjusted, a coefficient number to modify, how to modify the coefficient number, and so on. As another example, in block 620, the network device 102 may encode the request in one or more PCS alignment markers of the network frame. As yet another example, in block 622, the network device 102 streams the request in place of one or more idle characters following the network frame. In block 624, the network device 102 sends the request message to the other network in-band over the equalization control channel. In the LLDP example, the network device 102 may send the frame according to the protocol. In the example of the PHY layer encoding, the network device 102 may send the network frame(s) over the physical layer.

In block 626, the network device 102 waits for a response from the other network device. For instance, the network device 102 may start a wait timer to wait for the response. In block 628, the network device 102 determines whether a response from the other network device is received. If so, then in block 630, the network device 102 processes the request. For example, the network device 102 may receive a response request from the other network device indicating that a specified coefficient number was updated. The network device 102 may then perform further action, such as continuing to monitor the link channel for additional variation. Otherwise, if a response is not yet received, in block 632, the network device 102 determines whether the wait timer is expired (e.g., the wait timer exceeds a predefined threshold). If not, then the network device 102 continues to wait until a response is received. Further, in block 634, the network device 102 resends the request message. Doing so accounts for possible noise in the link channel between the network device 102 and the other network device, e.g., if the other network device (which provides support for the equalization channel) does not receive the previously sent request. If the wait timer expires, then in block 636, the network device 102 generates and returns a timeout error. The timeout error may indicate that the other network device does not support the equalization control channel as implemented on the network device 102.

Figure 8:
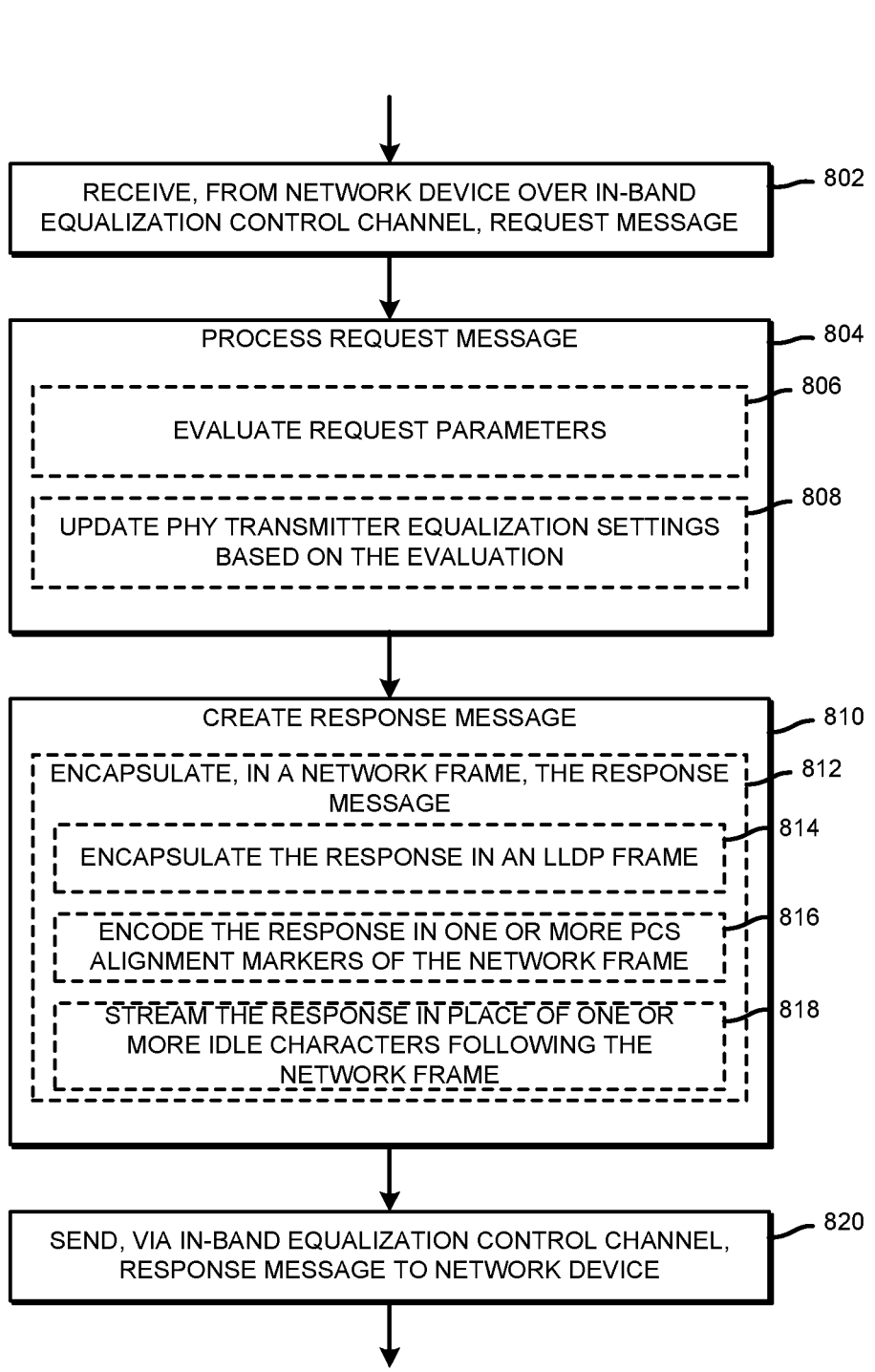
FIG. 8 is a simplified flow diagram of at least one embodiment of a method for processing a request to adjust link equalization settings over an in-band equalization control channel that may be performed by a network device of FIG. 1.

Referring now to FIG. 8, the network device 102, in operation, may perform a method 800 for responding to a request message sent over the equalization control channel from another network device. As shown, method 800 begins in block 802, where the network device 102 receives, in-band over the equalization control channel, a network frame representative of an equalization control request message.

In block 804, the network device 102 processes the request message. In particular, in block 806, the network device 102 evaluates parameters of the request, such as the request ID, lane ID, coefficient number, whether to increment or decrement the coefficient number, and the like. In block 808, the network device 102 updates the PHY transmitter settings in the network device 102 based on the evaluation. For example, the network device 102 may tune the coefficient number according to the request, e.g., by incrementing or decrementing the coefficient number.

In block 810, the network device 102 creates the response message. Particularly, in block 812, the network device 102 encapsulates, in a network frame, the response message. For example, in block 814, the network device 102 may generate an LLDP frame with a header that identifies a frame as an equalization control response message. Further, the network device 102 encodes fields corresponding to the response message, such as request ID, lane ID, coefficient number, and status of the coefficient number. As another example, in block 816, the network device 102 encodes the request in one or more PCS alignment markers of the network frame. As yet another example, in block 818, the network device 102 streams portions of the response in place of one or more idle characters following the network frame. In block 820, the network device 102 sends, via the equalization control channel, the response message to the other network device.

EXAMPLES

Illustrative examples of the technologies disclosed herein are provided below. An embodiment of the technologies may include any one or more, and any combination of, the examples described below.

Example 1 includes a network device, comprising a compute engine comprising at least a memory and a processor; and a network interface controller (NIC) to monitor variation in a property of a link channel that connects the network device with a second network device, detect, based on the monitored channel variation, an event that triggers a condition to change an equalization setting of the link channel; and communicate, in response to the detection and via an in-band equalization control channel, a change to the equalization setting of the link channel to the second network device.

Example 2 includes the subject matter of Example 1, and wherein to communicate the change to the property of the link channel comprises to communicate the change in the equalization setting of the link channel without disruption to network traffic between the network device and the second network device.

Example 3 includes the subject matter of any of Examples 1 and 2, and wherein to communicate the change in the equalization setting of the link channel to the second network device comprises to encapsulate a request to change the equalization setting of the link channel in one or more network frames; and send the one or more network frames to the second network device.

Example 4 includes the subject matter of any of Examples 1-3, and wherein to encapsulate the request in the one or more network frames comprises to encapsulate the request in a Link Layer Discovery Protocol (LLDP) frame and wherein to send the network frame to the second network device comprises to send the LLDP frame to the second network device via LLDP.

Example 5 includes the subject matter of any of Examples 1-4, and wherein to encapsulate the request in the one or more network frames comprises to encode the request in one or more physical coding sublayer (PCS) alignment markers of the network frame.

Example 6 includes the subject matter of any of Examples 1-5, and wherein to encapsulate the request in the one or more network frames comprises to transmit, to the second network device, a first network frame; transmit, to the second network device, and prior to transmission of a second network frame, at least a portion of the request, wherein the at least a portion of the request is transmitted in place of one or more idle characters; and transmit the second network frame.

Example 7 includes the subject matter of any of Examples 1-6, and wherein the NIC is further to receive, via the in-band equalization control channel, a second request from the second network device, wherein the second request is to change the equalization setting of the link channel.

Example 8 includes the subject matter of any of Examples 1-7, and wherein the NIC is further to update, as a function of the second request, the equalization setting of the link channel.

Example 9 includes the subject matter of any of Examples 1-8, and wherein the NIC is further to create a response message indicative of the updated equalization setting of the link channel; and send, via the in-band equalization control channel, the response message to the second network device.

Example 10 includes the subject matter of any of Examples 1-9, and wherein to monitor the variation in the property of the link channel connecting the network device with a second network device comprises to monitor at least one of a temperature of hardware components of the network device, link convergence, uptime of the link channel, or an age of the network device.

Example 11 includes one or more machine-readable storage media including a plurality of instructions, which, when executed, causes a network device to monitor variation in a property of a link channel that connects the network device with a second network device, detect, based on the monitored channel variation, an event that triggers a condition to change an equalization setting of the link channel; and communicate, in response to the detection and via an in-band equalization control channel, a change to the equalization setting of the link channel to the second network device.

Example 12 includes the subject matter of Example 11, and wherein to communicate the change to the equalization setting of the link channel comprises to communicate the changes in the equalization setting of the link channel without disruption to network traffic between the network device and the second network device.

Example 13 includes the subject matter of any of Examples 11 and 12, and wherein to communicate the change in the equalization setting of the link channel to the second network device comprises to encapsulate a request to change the equalization setting of the link channel in one or more network frames; and send the one or more network frames to the second network device.

Example 14 includes the subject matter of any of Examples 11-13, and wherein to encapsulate the request in the one or more network frames comprises to encapsulate the request in a Link Layer Discovery Protocol (LLDP) frame and wherein to send the network frame to the second network device comprises to send the LLDP frame to the second network device via LLDP.

Example 15 includes the subject matter of any of Examples 11-14, and wherein to encapsulate the request in the one or more network frames comprises to encode the request in one or more physical coding sublayer (PCS) alignment markers of the network frame.

Example 16 includes the subject matter of any of Examples 11-15, and wherein to encapsulate the request in the one or more network frames comprises to transmit, to the second network device, a first network frame; transmit, to the second network device, and prior to transmission of a second network frame, at least a portion of the request, wherein the at least a portion of the request is transmitted in place of one or more idle characters; and transmit the second network frame.

Example 17 includes the subject matter of any of Examples 11-16, and wherein the plurality of instructions further causes the network device to receive, via the in-band equalization control channel, a second request from the second network device, wherein the second request is to change the equalization setting of the link channel.

Example 18 includes the subject matter of any of Examples 11-17, and wherein the plurality of instructions further causes the network device to update, as a function of the second request, the equalization setting of the link channel.

Example 19 includes the subject matter of any of Examples 11-18, and wherein the plurality of instructions further causes the network device to create a response message indicative of the updated equalization setting of the link channel; and send, via the in-band equalization control channel, the response message to the second network device.

Example 20 includes the subject matter of any of Examples 11-19, and wherein to monitor the variation in the property of the link channel connecting the network device with a second network device comprises to monitor at least one of a temperature of hardware components of the network device, link convergence, uptime of the link channel, or an age of the network device.

Example 21 includes a method, comprising monitoring, by a network device, variation in a property of a link channel that connects the network device with a second network device, detecting, by the network device and based on the monitored channel variation, an event that triggers a condition to change an equalization setting of the link channel; and communicating, by the network device and in response to the detection and via an in-band equalization control channel, a change to the equalization setting of the link channel to the second network device.

Example 22 includes the subject matter of Example 21, and wherein communicating the change to the equalization setting of the link channel comprises communicating, by the network device, the change in the equalization setting of the link channel without disruption to network traffic between the network device and the second network device.

Example 23 includes the subject matter of any of Examples 21 and 22, and wherein communicating the change in the equalization setting of the link channel to the second network device comprises encapsulating, by the network device, a request to change the equalization setting of the link channel in one or more network frames; and sending, by the network device, the one or more network frames to the second network device.

Example 24 includes a network device comprising circuitry for monitoring variation in a property of a link channel that connects the network device with a second network device, means for detecting, and based on the monitored channel variation, an event that triggers a condition to change an equalization setting of the link channel; and means for communicating, in response to the detection and via an in-band equalization control channel, a change to the equalization setting of the link channel to the second network device.

Example 25 includes the subject matter of Example 24, and wherein the means for communicating the change to the equalization setting of the link channel comprises means for communicating the changes in the equalization setting of the link channel without disruption to network traffic between the network device and the second network device.

The invention claimed is:

1. A network device, comprising:
a network interface controller (NIC) to:
monitor variation in a property of a link channel that connects a PHY of the network device with a second PHY of a second network device,
detect, based on the monitored channel variation, a condition to change an equalization setting of the link channel;
communicate, in response to the detection and via an in-band equalization control channel, a change to the equalization setting of the link channel to the second network device to encapsulate a request to change the equalization setting of the link channel in one or more network frames and send the one or more network frames to the second network device to adjust the link equalization setting with the second network device without disruption to network traffic between the network device and the second network device;
receive, via the in-band equalization control channel, a second request from the second network device, wherein the second request is to change the equalization setting of the link channel; and
update, based at least in part on the second request, the equalization setting of the link channel.

2. The network device of claim 1, wherein to encapsulate the request in the one or more network frames comprises to encapsulate the request in a Link Layer Discovery Protocol (LLDP) frame and wherein to send the network frame to the second network device comprises to send the LLDP frame to the second network device via LLDP.

3. The network device of claim 1, wherein to encapsulate the request in the one or more network frames comprises to encode the request in one or more physical coding sublayer (PCS) alignment markers of the network frame.

4. The network device of claim 1, wherein to encapsulate the request in the one or more network frames comprises to:
transmit, to the second network device, a first network frame;
transmit, to the second network device, and prior to transmission of a second network frame, at least a portion of the request, wherein the at least a portion of the request is transmitted in place of one or more idle characters; and
transmit the second network frame.

5. The network device of claim 1, wherein the NIC is further to:
create a response message indicative of the updated equalization setting of the link channel; and
send, via the in-band equalization control channel, the response message to the second network device.

6. The network device of claim 1, wherein to monitor the variation in the property of the link channel connecting the network device with a second network device comprises to monitor at least one of a temperature of hardware components of the network device, link convergence, uptime of the link channel, or an age of the network device.

7. One or more machine-readable storage media including a plurality of instructions, which, when executed, causes a network device to:
monitor variation in a property of a link channel that connects a PHY of the network device with a second PHY of a second network device,
detect, based on the monitored channel variation, a condition to change an equalization setting of the link channel;
communicate, in response to the detection and via an in-band equalization control channel, a change to the equalization setting of the link channel to the second network device to encapsulate a request to change the equalization setting of the link channel in one or more network frames and send the one or more network frames to the second network device to adjust the link equalization setting with the second network device without disruption to network traffic between the network device and the second network device;
receive, via the in-band equalization control channel, a second request from the second network device, wherein the second request is to change the equalization setting of the link channel; and
update, based at least in part on the second request, the equalization setting of the link channel.

8. The one or more machine-readable storage media of claim 7, wherein to communicate the change in the equalization setting of the link channel to the second network device comprises to:
encapsulate a request to change the equalization setting of the link channel in one or more network frames; and
send the one or more network frames to the second network device.

9. The one or more machine-readable storage media of claim 8, wherein to encapsulate the request in the one or more network frames comprises to encapsulate the request in a Link Layer Discovery Protocol (LLDP) frame and wherein to send the network frame to the second network device comprises to send the LLDP frame to the second network device via LLDP.

10. The one or more machine-readable storage media of claim 8, wherein to encapsulate the request in the one or more network frames comprises to encode the request in one or more physical coding sublayer (PCS) alignment markers of the network frame.

11. The one or more machine-readable storage media of claim 8, wherein to encapsulate the request in the one or more network frames comprises to:
transmit, to the second network device, a first network frame;
transmit, to the second network device, and prior to transmission of a second network frame, at least a portion of the request, wherein the at least a portion of the request is transmitted in place of one or more idle characters; and
transmit the second network frame.

12. The one or more machine-readable storage media of claim 7, wherein the plurality of instructions further causes the network device to:
create a response message indicative of the updated equalization setting of the link channel; and
send, via the in-band equalization control channel, the response message to the second network device.

13. The one or more machine-readable storage media of claim 7, wherein to monitor the variation in the property of the link channel connecting the network device with a second network device comprises to monitor at least one of a temperature of hardware components of the network device, link convergence, uptime of the link channel, or an age of the network device.

14. A method, comprising:
monitoring, by a network device, variation in a property of a link channel that connects a PHY of the network device with a second PHY of a second network device, detecting, by the network device and based on the monitored channel variation, a condition to change an equalization setting of the link channel;

communicating, by the network device and in response to the detection and via an in-band equalization control channel, a change to the equalization setting of the link channel to the second network device to encapsulate a request to change the equalization setting of the link channel in one or more network frames and send the one or more network frames to the second network device to adjust the link equalization setting with the second network device without disruption to network traffic between the network device and the second network device;

receive, via the in-band equalization control channel, a second request from the second network device, wherein the second request is to change the equalization setting of the link channel; and update, based at least in part on the second request, the equalization setting of the link channel.

15. A network device comprising:

circuitry for monitoring variation in a property of a link channel that connects a PHY of the network device with a second PHY of a second network device, means for detecting, and based on the monitored channel variation, a condition to change an equalization setting of the link channel; and means for communicating, in response to the detection and via an in-band equalization control channel, a change to the equalization setting of the link channel to the second network device to encapsulate a request to change the equalization setting of the link channel in one or more network frames and send the one or more network frames to the second network device to adjust the link equalization setting with the second network device without disruption to network traffic between the network device and the second network device;

means for receiving, via the in-band equalization control channel, a second request from the second network device, wherein the second request is to change the equalization setting of the link channel; and means for updating, based at least in part on the second request, the equalization setting of the link channel.

\* \* \* \* \*